3,644,616
Patented Feb. 22, 1972

3,644,616
SYNERGISTIC COMPOSITION OF RIFAMPICIN AND STREPTOMYCIN
Edward Alexander Konopka, Murray Hill, and Justus Melchior Gelzer, Summit, N.J., assignors to Ciba Corporation, Summit, N.J.
No Drawing. Filed Mar. 24, 1969, Ser. No. 809,967
Int. Cl. A61k 21/00
U.S. Cl. 424—114
4 Claims

ABSTRACT OF THE DISCLOSURE

Rifamycines or their semisynthetic derivatives, in combination with other antibiotics, exhibit synergistic effects against Gram-negative bacteria.

SUMMARY OF THE INVENTION

The present invention concerns and has for its object the provision of new pharmaceutical or veterinary compositions, feedstuffs or feed additives comprising combinations of (a) rifamycines or their semisynthetic derivatives, with (b) other antibiotics, preferably penicillines, cephalosporines, streptomycines, kanamycines, gentamycines, tetracyclines, chloramphenicol, macrolides or viomycin, as well as of methods for the preparation and application of these products. Said compositions are useful antibiotics and the feed preparations useful growth promotors.

DESCRIPTION OF THE PREFERRED EMBODIMENTS

The rifamycines of the new compositions and feed preparations are known and represent especially the rifamycines B, SV, S, O, AG or X, rifamide, rifazine or advantageously rifampicin. Said component is described, inter alia, in Il Farmaco, Ed. Sci. 16, 755 and 766 (1961), 21, 68 (1966) and 22, 307 (1967); J. Med. Chem. 7, 596 (1964), 8, 790 (1965) and 11, 936 (1968); Antimicrobial Agents and Chemotherapy (Am. Soc. Microbiol.) 1965, p. 765 or 1967, p. 699, the Report of the 5th Internatl. Congr. of Chemotherapy, 1967; French Pats. Nos. 1,434,-532, 1,457,435 and 5518M, Belgian Pat. Nos. 654,209 and 685,886, South African Pat. 68/0903 and U.S. Pat. No. 3,349,082.

The antibiotics used are also known and are represented especially by ampicillin, streptomycin, kanamycin, gentamycin, aureomycin, terramycin and chloramphenicol. They are described, inter alia, in Erhart-Ruschig, Arzneimittel II, 1570 et seq. (Verlag Chemie, Weinheim 1968). Said book also describes the rifamycinese on page 1517 et seq.

The compositions and feed preparations according to the invention contain an effective amount of the rifamycines and other antibiotics in a ratio between about 1:10 and 10:1, preferably between about 1:5 and 5:1, especially between about 1:2 and 2:1, and the usual amount of conventional excipients or extenders, whereby the total amount of both can be less than that used in the known preparations of the components.

The antibacterial effect of antibiotics can be tested in vitro, for example, by estimation of the growth dynamics of said Gram-negative bacteria in media which contain, besides the nutrients, (c) no antibiotic (control $\phi$,
(d) the rifamycines (A) or other antibiotics (B) alone,
(e) both components $(A+B)$.

The amounts of A and B used according to (e) are half of those used according to (d).

Surprisingly, it has been found that the growth dynamics of Gram-negative bacteria, such as the Aerobacter, Brucella, Escherichia, Klebsiella, Malleomyces, Neisseria, Pasteurella, Proteus, Pseudomonas, Salmonella, Shigella and Vibrio strains, especially those of Escherichia coli and Proteus mirabilis, according to items (c), (d) and (e) generally can be depicted as follows:

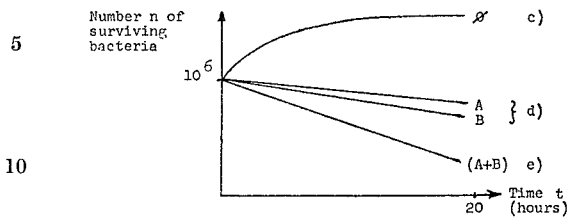

These functions $\phi(n, t)$ depicting said growth dynamics indicate that the antibacterial effect of a combination according to the invention is bigger than that obtainable with the same amount of the components.

Accordingly, the new compositions and feed preparations are superior to those of the presently used components, since lesser doses can be applied and, moreover, a suppression of resistance development can be achieved.

Particularly useful are pharmaceutical or veterinary compositions, as well as feed stuffs and feed additives, comprising an effective amount of (a) rifampicin and (b) streptomycin, kanamycin or gentamycin in a proportion between about 1:5 and 5:1, advantageously between 1:2 and 2:1, and the usual amount of conventional excipients or extenders.

The pharmaceutical or veterinary compositions according to the invention contain both of said antibiotics in about the same or a lesser amount than that used in conventional compositions of the components, in conjunction or admixture with inorganic or organic, solid or liquid pharmaceutical excipients suitable for enteral or parenteral administration. Suitable excipients are substances that do not react with the antibiotics used, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, but also in liquid form, e.g. as isotonic solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. The compositions are prepared by conventional methods; they usually contain about 1 to 75%, particularly about 10 to 50% of the active ingredients.

The feedstuffs or additives for feed or drinking water contain both of said antibiotics also in about the same or a lesser amount as that used in conventional feedstuffs or additives, which are intended to promote the growth and feed efficiency of domestic animals. Said feedstuffs or additives contain the conventional extenders, diluents and/or nutrients, such as sucrose, glucose, molasses, fermentation residues, cornmeal, ground and rolled oats, wheat shorts and middlings, meat scrap, oil cake, soybean and fish meal, alfalfa, clover or grass clippings and the like, mineral supplements, such as bone meal, calcium carbonate, iodized salt and the like, vitamins, such as vitamins A, B, C and D, and other suitable substances, such as preservants, e.g. benzoic acid. The feedstuffs contain the active ingredients advantageously in the dosage range, for example, between about 0.00001 and 0.01%, whereas the additives may contain the pure substances, when used, for example, for the drinking water, but usually contain between about 1 and 75% thereof.

The following examples illustrate the invention and are not to be construed as being limitations thereon. Temperatures are given in degrees centigrade and all parts wherever given are parts by weight.

EXAMPLE 1

Conventional test tubes are filled with 10 ml. of conventional trypticase broth (c) alone, or such containing (d) rifampicin or the other antibiotics, or (e) the combinations thereof, in a concentration between about 5–20 µg./ml.

Hereupon 0.1 ml. of a freshly grown and standardized stock culture of *Escherichia coli* is added to said 10 ml. broth, so that it contains approximately $10^6$ organisms per ml. After 20 hours incubation at 37°, 1 ml. samples are removed and the number of viable cells therein determined according to the plate dilution method. It provides from a number of bacterial cells in a properly diluted specimen an equal number of visible colonies, which can be counted.

The following results are obtained:

| Antibiotic | Concentration, µg./ml. | No. of cells after— 0 hrs. | No. of cells after— 20 hrs. |
|---|---|---|---|
| None | 0 | $1.2 \cdot 10^6$ | $1.2 \cdot 10^9$ |
| Rifampicin (A) | 5 | $1.5 \cdot 10^6$ | $1.2 \cdot 10^9$ |
| Do | 10 | $1.1 \cdot 10^6$ | $1.0 \cdot 10^9$ |
| Do | 20 | $1.5 \cdot 10^6$ | $1.0 \cdot 10^9$ |
| Ampicillin (B) | 5 | $1.4 \cdot 10^6$ | $2.7 \cdot 10^8$ |
| A+B | 5+5 | $1.4 \cdot 10^6$ | $2.5 \cdot 10^5$ |
| Same | 10+5 | $1.4 \cdot 10^6$ | $1.9 \cdot 10^4$ |
| None | 0 | $1.7 \cdot 10^6$ | $1.7 \cdot 10^9$ |
| Rifampicin (A) | 5 | $1.7 \cdot 10^6$ | $1.0 \cdot 10^9$ |
| Streptomycin (B) | 10 | $1.6 \cdot 10^6$ | $1.0 \cdot 10^9$ |
| A+B | 5+10 | $1.8 \cdot 10^6$ | $6.8 \cdot 10^2$ |

Example 2

According to the method described in Example 1, the following results are obtained with *Proteus mirabilis*:

| Antibiotic | Concentration, µg./ml. | No. of cells after— 0 hrs. | No. of cells after— 20 hrs. |
|---|---|---|---|
| None | 0 | $1.8 \cdot 10^6$ | $1.8 \cdot 10^9$ |
| Rifampicin (A) | 5 | $2.4 \cdot 10^6$ | $1.2 \cdot 10^9$ |
| Do | 10 | $2.8 \cdot 10^5$ | $7.8 \cdot 10^3$ |
| Do | 20 | $2.1 \cdot 10^6$ | $1.0 \cdot 10^9$ |
| Streptomycin (B) | 5 | $1.6 \cdot 10^6$ | $1.5 \cdot 10^9$ |
| Do | 10 | $2.0 \cdot 10^6$ | $1.2 \cdot 10^9$ |
| Do | 20 | $1.5 \cdot 10^6$ | $1.1 \cdot 10^9$ |
| A+B | 5+5 | $2.3 \cdot 10^5$ | $7.5 \cdot 10^1$ |
| Same | 5+10 | $2.2 \cdot 10^6$ | $1.5 \cdot 10^1$ |
| Do | 10+5 | $2.1 \cdot 10^6$ | $2.3 \cdot 10^2$ |
| Do | 10+10 | $1.5 \cdot 10^6$ | $1.5 \cdot 10^2$ |

Example 3

Preparation of 1,000 capsules each containing 300 mg. of the active ingredients:

Formula: G.
- Rifampicin _____ 150
- Gentamycin _____ 150
- Talcum _____ 36
- Corn starch _____ 24
- Magnesium stearate _____ 16
- Lactose _____ 4

380

Procedure.—All powders are passed through a screen with an opening of 0.6 mm. and mixed thoroughly. 0.5 ml. hard gelatin capsules are filled with 380 mg. of said mixture, using a capsule filling machine.

EXAMPLE 4

Preparation of 1,000 capsules each containing 150 mg. of the active ingredients:

Formula: G.
- Rifampicin _____ 75
- Kanamycin _____ 75
- Ethyl cellulose _____ 3
- Stearic acid _____ 3

156

Preparation.—The ethyl cellulose and stearic acid are dissolved in 120 ml. methylene chloride, the antibiotics are added and the mass passed through a sieve with 0.6 mm. openings at a temperature of about 40°, whereby the methylene chloride evaporates. 156 mg. of the granulated obtained are filled into 0.5 ml. hard gelatine capsules using a capsule filling machine.

EXAMPLE 5

Preparation of a poultry feed containing 0.005% of the active ingredients:

Premix: G.
- Rifampicin _____ 25
- Aureomycin _____ 25
- Confectioners sugar _____ 50
- Soybean feed, solvent extracted _____ 275

375

Feed formula: Pounds
- Corn meal _____ 1103.0
- Soybean meal, 44% protein _____ 660.0
- Alfalfa meal _____ 30.0
- Dicalcium phosphate _____ 40.0
- Limestone meal _____ 10.0
- Salt _____ 5.0
- Fish meal, 60% protein _____ 40.0
- Stabilized fat _____ 60.0
- Dried whey _____ 40.0
- Manganese sulfate _____ 0.5
- Zinc oxide _____ 0.3
- d,l-Methionine _____ 1.5
- Vitamin premix _____ 10.0

2000.3

10 lb. of the vitamin composition contain: 16,000,000 I.U. Vit. A, 1,000,000 I.U. Vit. $D_3$, 5,000 I.U. Vit. E. acetate, 6 g. Vit. $K_3$, 6 mg. Vit. $B_{12}$, 3 g. riboflavin, 30 g. niacin, 5 g. calcium pantothenate and 100 g. ethoxyquin, made up to 10 lb. with corn meal.

Procedure.—The antibiotics and sugar are mixed thoroughly, screened through a sieve with 0.6 mm. openings and blended with the soybean feed.

The premix is then added to the feed in such amount as to obtain said concentration and the whole is homogenized in a horizontal drum mixer.

We claim:
1. An antibiotic pharmaceutical composition comprising essentially a Gram-negative antibiotically effective amount of (a) rifampicin and (b) streptomycin, in the proportions between about 1:2 and 2:1, and (c) an enterally or parenterally acceptable pharmaceutical excipient.

2. An antibiotic feedstuff or feed additive comprising essentially a growth promoting amount of (a) rifampicin and (b) streptomycin in the proportions between about 1:2 and 2:1, and (c) an extender, diluent or nutrient.

3. An antibiotic feedstuff as claimed in claim 2, containing between about 0.00001 and 0.01% of the components (a) and (b) in a nutrient.

4. An antibiotic feed additive as claimed in claim 2, containing between about 1 and 75% of the components (a) and (b) in an extender.

References Cited

Virchow et al.: Dtsch. Med. Wschr, 92, No. 48, 1967, pp. 2217–20.

JEROME D. GOLDBERG, Primary Examiner

PO-1050
(5/69)

UNITED STATES PATENT OFFICE
CERTIFICATE OF CORRECTION

Patent No. 3,644,616            Dated February 22, 1972

Inventor(s) Edward Alexander Konopka et al

It is certified that error appears in the above-identified patent and that said Letters Patent are hereby corrected as shown below:

Column 1, lines 5-6, delete "CIBA Corporation, Summit, N. J." and substitute --- CIBA-GEIGY Corporation, Ardsley, N. Y. ---

Signed and sealed this 16th day of April 1974.

(SEAL)
Attest:

EDWARD M. FLETCHER, JR.
Attesting Officer

C. MARSHALL DANN
Commissioner of Patents